(12) United States Patent
Richter

(10) Patent No.: US 9,645,348 B2
(45) Date of Patent: May 9, 2017

(54) METHOD OF PRODUCING A LENS MOUNT AND A LENS MOUNT WHICH CAN BE FIXED RADIALLY IN A LENS TUBE

(71) Applicant: JENOPTIK Optical Systems GmbH, Jena (DE)

(72) Inventor: Uwe Richter, Jena (DE)

(73) Assignee: JENOPTIK Optical Systems GmbH, Jena (DE)

(*) Notice: Subject to any disclaimer, the term of this patent is extended or adjusted under 35 U.S.C. 154(b) by 141 days.

(21) Appl. No.: 14/769,395

(22) PCT Filed: Feb. 20, 2015

(86) PCT No.: PCT/EP2015/000390
§ 371 (c)(1),
(2) Date: Aug. 20, 2015

(87) PCT Pub. No.: WO2015/124312
PCT Pub. Date: Aug. 27, 2015

(65) Prior Publication Data
US 2016/0252701 A1  Sep. 1, 2016

(30) Foreign Application Priority Data

Feb. 20, 2014 (DE) ........................ 10 2014 102 220

(51) Int. Cl.
*G02B 7/02* (2006.01)
*B23B 5/36* (2006.01)

(52) U.S. Cl.
CPC ............... *G02B 7/026* (2013.01); *B23B 5/36* (2013.01); *G02B 7/023* (2013.01)

(58) Field of Classification Search
CPC ............ G02B 7/026; G02B 7/023; B23B 5/36
USPC ......................................................... 359/830
See application file for complete search history.

(56) References Cited

U.S. PATENT DOCUMENTS

| 6,262,853 B1 | 7/2001 | Takanashi et al. |
| 6,381,081 B1 | 4/2002 | Ford |
| 2013/0272689 A1 | 10/2013 | Subratie |

FOREIGN PATENT DOCUMENTS

| DE | 27 31 273 A1 | 1/1979 |
| DE | 37 30 094 C4 | 12/1988 |
| DE | 100 42 844 C1 | 4/2002 |
| DE | 10 2006 060088 A1 | 6/2008 |
| DE | 10 2008 028 720 A1 | 12/2009 |
| DE | 10 2008 063 223 B3 | 9/2010 |
| EP | 1 632 799 A1 | 3/2006 |
| FR | 2 428 851 A1 | 1/1980 |

*Primary Examiner* — Bumsuk Won
*Assistant Examiner* — Grant Gagnon
(74) *Attorney, Agent, or Firm* — Muncy, Geissler, Olds & Lowe, P.C.

(57) ABSTRACT

A lens mount for radially fixing, or for radially adjusting and fixing, in a lens tube, having a mounting ring in which tangentially running first slots form cylindrical segments which, during the operation of turning the external diameter of the mounting ring to a nominal dimension are deformed by a screw by a width of the first slots, and therefore the circumferential surface of the mounting ring is not turned, at least in part, along the segment and the external diameter has an oversize.

9 Claims, 5 Drawing Sheets

METHOD OF PRODUCING A LENS MOUNT AND A LENS MOUNT WHICH CAN BE FIXED RADIALLY IN A LENS TUBE

This nonprovisional application is a National Stage of International Application No. PCT/EP2015/000390, filed Feb. 20, 2015, of which claims priority to German Patent Application No. 10 2014 102 220.3, filed Feb. 20, 2014; both applications are herein incorporated by reference.

BACKGROUND OF THE INVENTION

Field of the Invention

The present invention relates to a method for producing a lens mount and a lens mount that can be fixed radially in a lens tube.

Description of the Background Art

Lens mounts serve for retaining optical lenses in a precise mechanical manner in specific positions within a lens system, i.e. at a certain distance from one another and orientation in relation to one another, which can be described by the axial distance between the main points of the lenses and the radial distance thereof from an optical axis of the lens system. In particular in high-performance lens systems, however, it is possible for even slight positional deviations of individual lenses of the lens system to result in undesired system errors.

In lens systems, the individual lenses are arranged in relation to one another, usually directly or indirectly via a lens mount, within a lens tube, also referred to as a lens barrel.

The radial deviation of the position of the main points of the lenses from the optical axis of the lens system, said optical axis being formed in practice by the mechanical axis of the lens tube, is often kept to a low level via low-tolerance clearance fits between the lens mounts and the lens tube and axial bracing of the lens mounts in relation to one another.

In other solutions, which require greater outlay in respect of production and assembly, the lens mounts are fixed radially in relation to the lens tube, possibly following prior radial adjustment.

Plate-like filter holders which are intended for optical filters for cameras and are disclosed in laid-open application US 2013/0272689 A1 have, on both end sides, respectively matching clamping elements, by which they can be connected to one another, or to parts of the camera, along the optical axis of the camera. The connection allows rotation of the filter holders around the optical axis, radial play being suppressed. For this purpose, matching, resilient bearing elements and circular, centering guide grooves are provided on the mutually opposite end surfaces. Precise radial adjustment is not necessary here.

A radially adjustable lens mount is described in laid-open application DE 27 31 273 A1. The lens mount is accommodated in a sleeve-like ring and has, on its cylindrical lateral surface, three adjacent tangential flattened portions and, diametrically opposite, an elevation. Protuberances are arranged at equal intervals on the inner surface of the ring. Rotation of the lens mount in relation to the ring alters the position of the flattened portions and of the elevation in relation to the protuberances, and this allows radial displacement of the lens.

DE 37 30 094 C2 describes an apparatus in which an auxiliary mount, which can be displaced radially in a main mount, is pushed onto a base surface indirectly by an axially acting spring force. Two excentrics, which are mounted in a rotatable manner on the main mount in a state in which they are offset through 90° in relation to one another, and opposite compression springs are provided for radial displacement. Within the context of the present invention, it is possible to understand the main mount as being a lens tube and the auxiliary mount as being a lens mount.

FR 2 428 852 A1 describes a mount assembly in which a lens mount and a lens tube have arranged between them spring elements which give rise to a more or less uniformly distributed radially acting spring force between the lens tube and the lens mount and retain the lens mount with centering in the direction of the axis of symmetry of the lens tube. This spring force can be generated by differently configured spring rings, which enclose the lens mount virtually entirely, or by a multiplicity of individual spring elements, such as compression springs or leaf springs.

The two aforementioned mount assemblies comprise separate flexible elements with which the lens mount, in which a lens is mounted, can be fixed in a radially play-free manner within the lens tube. The axial positioning of the lens mount in the lens tube is predetermined by the defined position of the flexible elements within the lens tube.

DE 100 42 844 C1 discloses a lens mount which is formed by a mounting ring and a multiplicity of inwardly directed leaf-spring elements which are formed monolithically on the mounting ring and have their free ends engaging in an annular groove formed on the circumferential surface of a lens. The lens can be adjusted radially within the lens mount via on at least two threaded pins, which act at the free ends of the leaf-spring elements and are mounted in the mounting ring. If the lens mount has been fixed in a lens tube, it is thus also possible for the lens to be adjusted radially, and fixed, in relation to the axis of symmetry of the lens tube. The fixing of such a lens mount in a lens tube is achieved usually via an axial force fit, e.g. by means of a retaining ring. A fundamental disadvantage of this fixing method is that it may result, e.g. as a result of impact loading, acting counter to the static friction, in play-delimited, irreversible radial displacement of the lens mount within the lens tube.

In comparison with the aforementioned lens assemblies, there is advantageously no need here for any additional clamping elements, but the functioning of the lens mount requires the latter to have a considerable radial extent, for which the necessary amount of installation space is not always present.

A further possibility for monolithic clamping elements is disclosed in respect of an eyepiece assembly which has diopter adjustments and is disclosed in laid-open application DE 10 2008 028 720 A1. For the diopter adjustment, an optical element accommodated in a mount is displaced along the optical axis. The mount and a mount-accommodating sleeve have provided between them frictional elements, which generate a minimum moment which has to be overcome and which makes it more difficult for the mount to be displaced in an undesired manner. In one embodiment, the frictional elements are generated by parts of the mount, which butts against the sleeve, containing slots and by resulting resilient fingers being spread apart by a spring element inserted therein. The invention realizes the object of adjusting the optical element axially. However, it is not suitable for radial adjustment.

A monolithic optical mount disclosed in DE 10 2008 063 223 B3 comprises a fixed outer mounting ring and a radially adjustable inner mounting ring. The mounting rings are formed by separating material cutouts and are connected only via remaining crosspieces. Corresponding to the crosspieces, which are arranged in a uniformly offset manner in relation to one another, the outer mounting ring has manipulator units, which act radially on the inner mounting ring. Manipulator units, in the simplest case, are threaded pins, which counteract springs on other manipulator units. This embodiment of the optical mount has the same disadvantages already explained in relation to DE 100 42 844 C1.

A multiplicity of further lens mounts in which the lenses are retained within the lens mount via flexible elements which are formed within a mounting ring so as to be connected monolithically thereto are known. Lens mounts in which flexible elements are formed on the circumference of a mounting ring and are connected monolithically to said mounting ring are not known.

SUMMARY OF THE INVENTION

The object of the invention is to create a novel lens mount which requires only a small amount of radial installation space and can be fixed radially within a lens tube.

It should also advantageously be possible for the lens mount to be adjusted radially, prior to being fixed, within an amount of play between the lens mount and the lens tube.

The object of the invention should also be that of finding a novel method of producing a lens mount which can be fixed radially in a lens tube, and which preferably can also be adjusted radially within an amount of play beforehand.

The object is achieved, in respect of a lens mount, as claimed in claim 6 and, in respect of a production method, as claimed in claim 1. Advantageous embodiments are given in the dependent claims referring back to claims 6 and 1 respectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

All the exemplary embodiments of a lens mount according to the invention have in common the fact that they comprise a mounting ring 1 in which are formed one or more, preferably three, cylinder-portion-like segments 3 bounded by first slots 2, which can be deformed within the mounting ring 1 by forces which act radially in relation to an axis of symmetry 1.0 of the mounting ring 1, and are realized via screw connections.

Figure 1A:
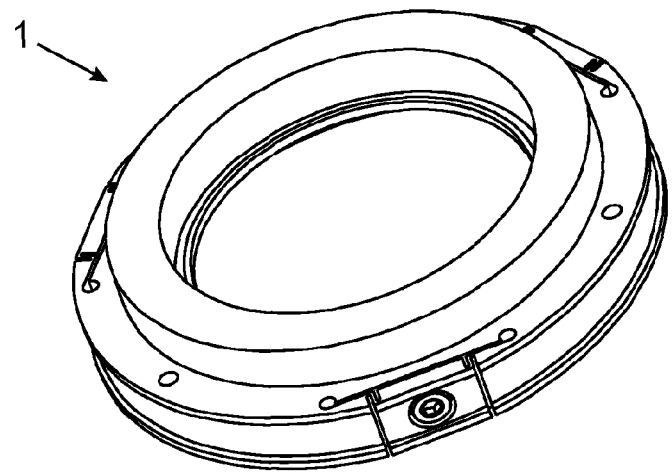
FIG. 1a shows a perspective view from above of a first exemplary embodiment of a lens mount.
Figure 1B:
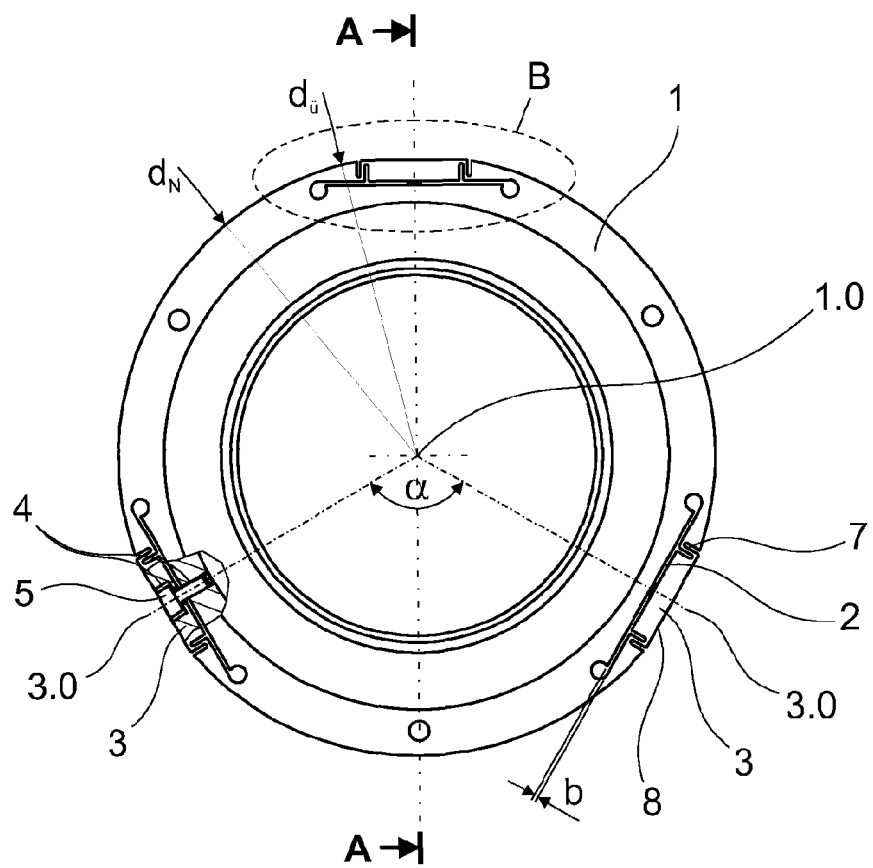
FIG. 1b shows a plan view of a lens mount according to FIG. 1a, FIG. 1c shows a sectional view of a lens mount according to FIG. 1a, FIG. 1d shows a perspective view from beneath of a lens mount according to FIG. 1a, FIG. 2a shows a detail of a lens mount according to FIGS. 1a-1d in a first production state.
Figure 1C:
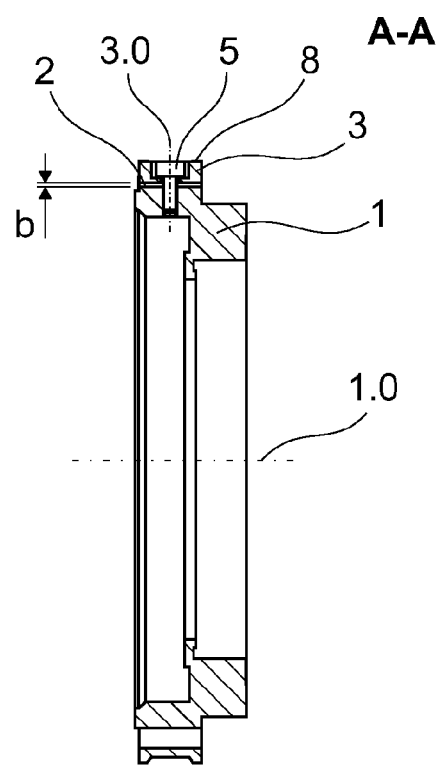
Figure 1D:
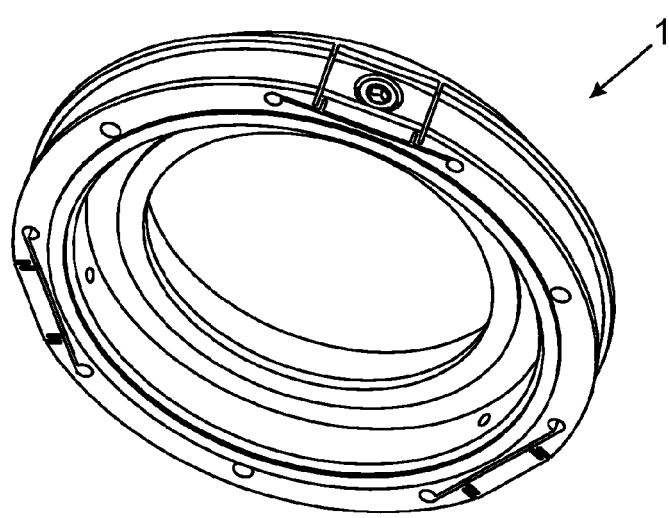
Figure 2A:
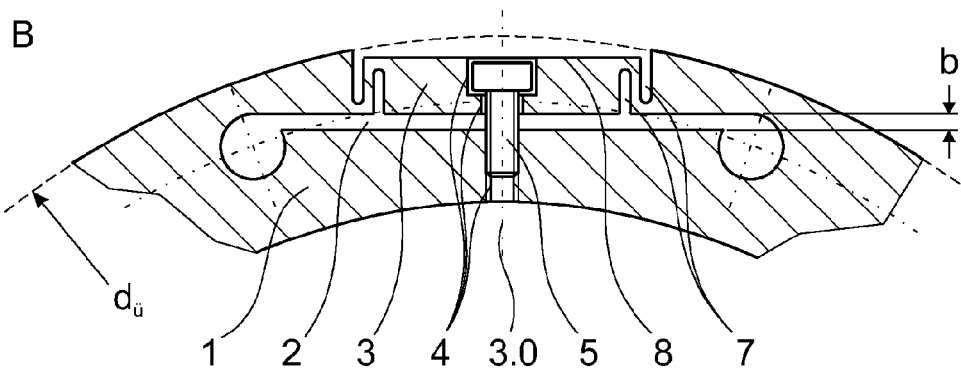
FIG. 2b shows a detail according to FIG. 2a in a second production state.
FIG. 2c shows a detail according to FIG. 2a in a third production state.
FIG. 2d shows a detail according to FIG. 2a in a fourth production state.
Figure 2B:
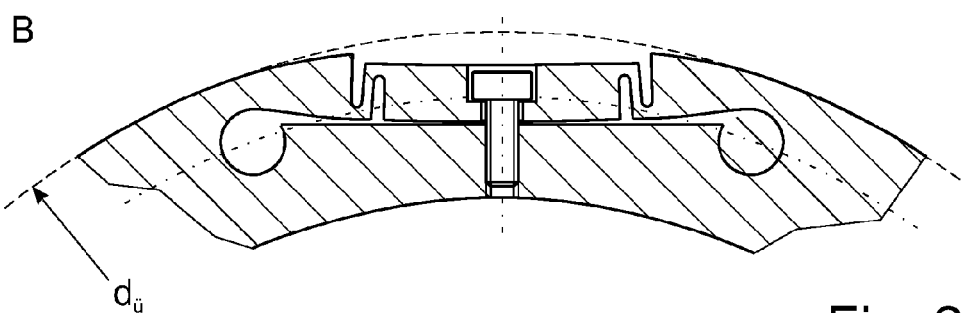
Figure 2C:
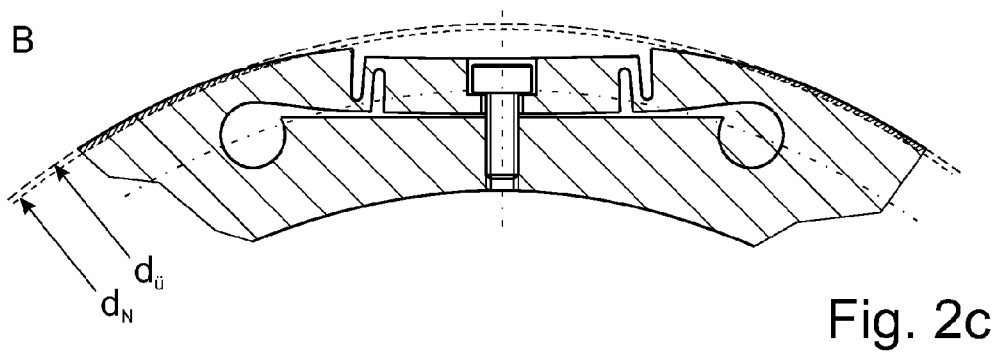
Figure 2D:
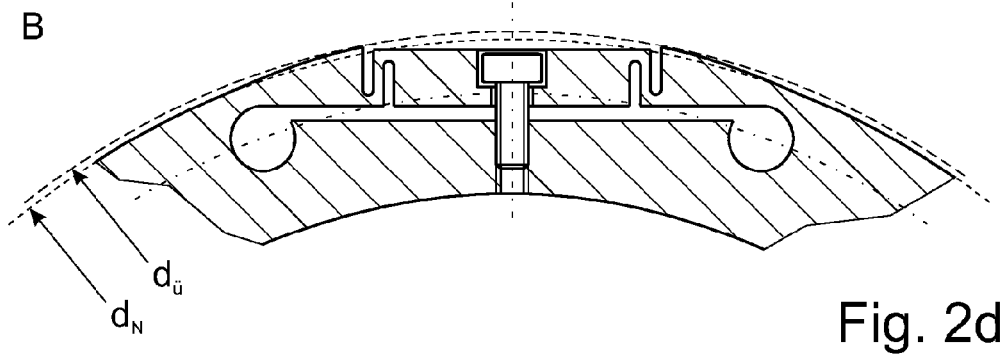
Figure 3:
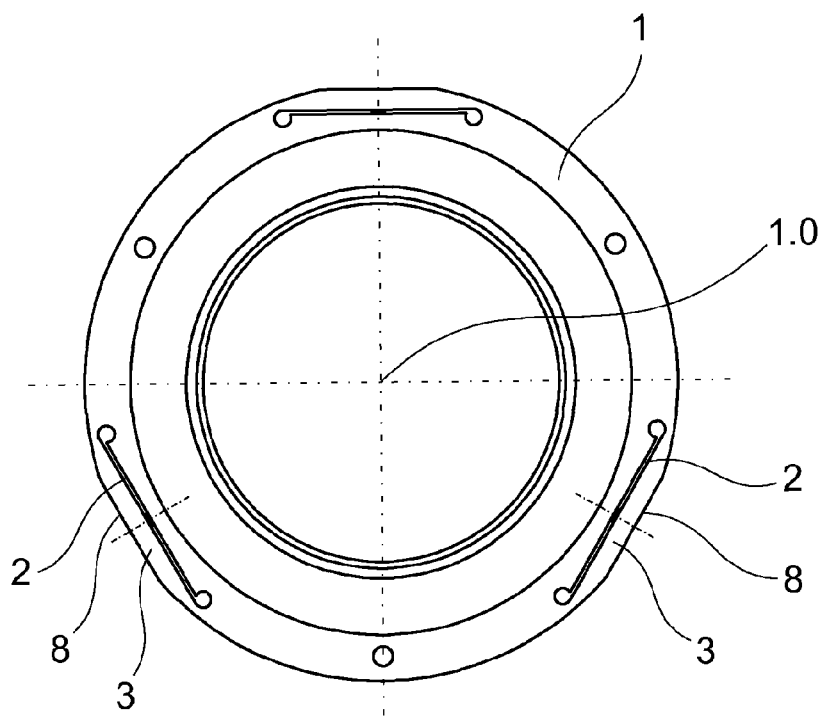
FIG. 3 shows a plan view of a second exemplary embodiment of a lens mount.
Figure 4:
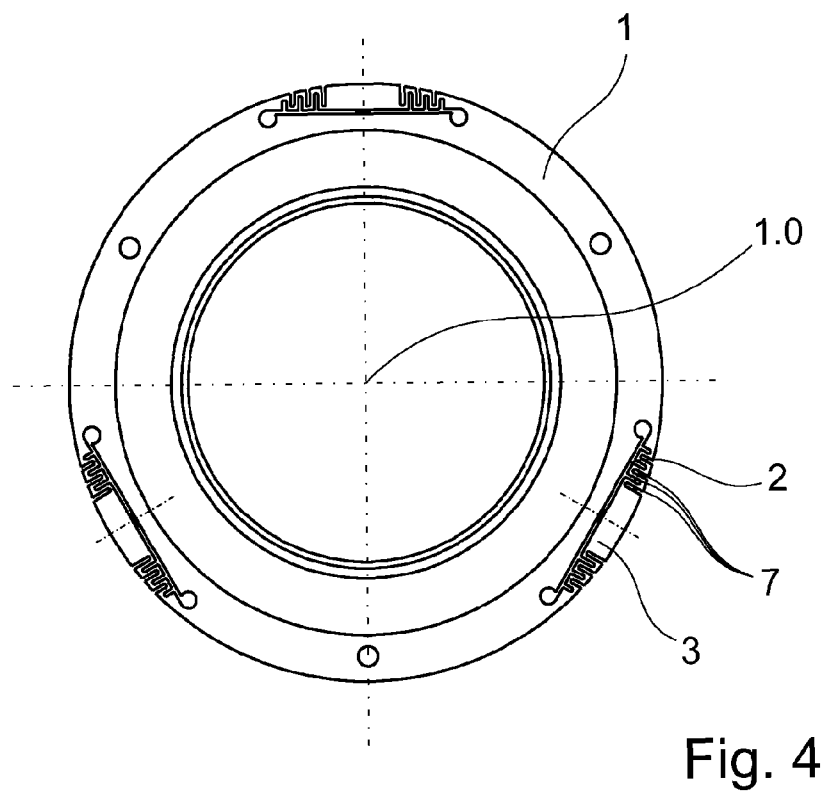
FIG. 4 shows a plan view of a third exemplary embodiment of a lens mount.
Figure 5:
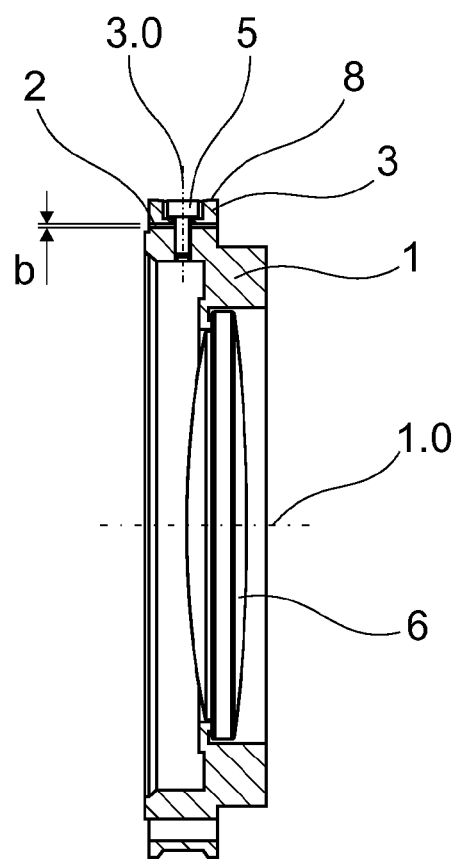
FIG. 5 shows a sectional view of a lens mount with a lens mounted therein.

A first exemplary embodiment is shown in FIGS. 1a to 1d. Further exemplary embodiments, shown in FIGS. 3 and 4, differ from the first exemplary embodiment by virtue of the segments 3 being of modified configuration. It is possible here, as shown in FIGS. 1 and 3, for a planar surface 8 to be provided on the circumferential surface of the segments 3, or also in an inwardly directed manner, and, as shown in FIG. 2 and in FIG. 4, for a relatively large number of second slots 7 to be provided.

For straightforward fixing of a lens mount within a lens tube, it is sufficient for the mounting ring 1 to have just one segment 3.

In order for the lens mount to be able to be adjusted, and fixed, within a lens tube, the mounting ring 1 has at least two, advantageously three, segments 3. The first slots 2 are then arranged at equal angular intervals α in relation to one another.

As can be seen in all the figures, a segment 3 is formed in each case by a first slot 2, which is introduced tangentially to an imaginary circular line around the axis of symmetry 1.0. Said first slot 2 is closed at its ends. It therefore does not separate the segment 3 fully from the mounting ring 1, and therefore the mounting ring 1, as seen from the circumferential surface thereof, remains a closed monolithic annular body.

The two ends of the first slot 2 and the circumferential surface of the mounting ring 1 thus have between them a material bond, in other words a monolithic connection, which, for functional purposes of the lens mount, acts as a solid-state hinge.

A stepped drill hole 4 is present in the center of the segment 3, arranged on a line of symmetry 3.0 and in a radial direction in relation to the axis of symmetry 1.0 of the mounting ring 1, said drill hole, beginning from the circumferential surface of the mounting ring 1, having a first step with an internal diameter which is larger than the external diameter of a head of a screw 5. The first step of the drill hole 4, furthermore, is deeper, at least by a width b of the first slot 2, than the height of the screw head, and therefore, in any conceivable installation state of the lens mount, the screw 5, rather than projecting beyond the circumference of the mounting ring 1, is arranged entirely within the mounting ring 1.

The drill hole 4 continues in the mounting ring 1, beyond the first slot 2, in the form of a threaded drill hole, and therefore the screw 5 can be screwed, through the segment 3 and the first slot 2, into the remaining part of the mounting ring 1. As the screw 5 is being tightened, its screw head acts as a stop for the segment 3 and, as tightening of the screw 5 continues, the segment 3 can be tightened by a flexing distance along the line of symmetry 3.0, equal to the width b of the first slot 2, in the direction of the axis of symmetry 1.0 of the mounting ring 1 and, accordingly, can be deformed to an increasing extent.

In order that the lens mount can be fixed radially within a lens tube by means of the segment 3, it is the case that, at least in a non-deformed state of the segment 3, the external diameter of the mounting ring 1 along the segment 3, at least in part, with an oversize $d_{ü}$ is larger than the external diameter of the mounting ring 1 outside the segment 3, where there is a nominal dimension $d_N$. Using the description of a method of producing the lens mount, this feature, which is essential to the invention, will be explained with reference to FIGS. 2a to 2d. These drawings, so as to illustrate in particular the feature of the differing external diameter along the the circumferential surface of the mounting ring 1, which in practice is given by a difference of just a few µm, have not been produced to scale.

The lens mount is dimensioned such that the nominal dimension $d_N$ is designed for a typical clearance fit with a lens tube. A lens tube should be understood to mean any tubular part in which a lens mount is customarily fixed. In the case of a clearance fit between a lens tube and a lens mount, the amount of play is typically approximately 5-10 µm.

The difference between the nominal dimension $d_N$ and the oversize $d_{ü}$ is selected such that it is larger than this amount of play, and therefore the segment 3, which ends up butting against the lens tube when fixed, is not completely relieved of stressing, in order to give rise to a sufficiently large restoring force. At the same time, the width b of the first slot 2 has to be larger than, or equal to, this difference, in order that the segment 3 can be deformed centrally along its line of symmetry 3.0 by this difference.

In order for the lens mount to be inserted into a lens tube, the screw 5 in the segment 3 is tightened to the maximum extent, as a result of which the segment 3 does not project beyond the rest of the circumferential surface of the mounting ring 1. The lens tube has, on its circumference, through-bores which correspond in number to the number of segments 3 of the mounting ring 1 of the lens mount which is to be inserted and through which the screws 5 of a lens mount can be actuated. Said through-bores may be slots, in order that the lens mount can be fixed in a variable manner in the axial direction. It is also possible, in practice, for the through-bores, which are required only for installing the lens mount, also to be introduced into the lens tube immediately prior to installation. This means that there is no need for the lens tube to be designed with any stepped portions or the like for the installation of the lens mount.

In contrast to the prior-art solutions in which a lens mount is fixed radially in a lens tube via separate flexible elements, which usually have a fixed axial position in the lens tube, the restoring forces of the segments 3 always act, as flexible elements, in the same radial plane on a lens 6 retained in the lens mount, irrespective of the axial position in the lens tube.

The lens 6 can be inserted into the lens mount following production or advantageously during production, as will be explained at a later stage in the text.

Once the lens mount has been inserted into, and positioned in, a lens tube, the screws 5 are loosened to an increasing extent, as a result of which the segments 3 are relieved of stressing to an increasing extent. By virtue of the screws 5, in the case of a mounting ring 1 having a plurality of segments 3, being loosened to different extents, that is to say being rotated by different angles, the lens mount, and thus the lens 6 mounted therein, can be adjusted in relation to the axis of the lens tube or in relation to the optical axis of another optical element already introduced in the lens tube. In the adjusted position, there is no longer any need for any additional fixing means, since all the segments 3 butt in a force-fitting manner against the inner circumference of the lens tube.

The segment 3 or the segments 3 ends or end up in abutment against the inner circumference of the lens tube at the inner circumference along contact regions, which can become reduced to contact lines, wherever the external diameter is largest.

As a result of a production method like that described hereinbelow, the segment 3, as long as there is no planar surface 8 present, would have the largest external diameter in its center, if there were no drill hole 4 there.

In order to achieve defined contact lines between the segment 3 and the lens tube, it is possible for the circumferential surface to be advantageously flattened around the drill hole 4, and therefore the drill hole 4 has formed around it a planar surface 8, which is located perpendicularly to the center line of the drill hole. The edges thereof then end up in abutment. This results, for each segment 3, in two contact lines which are spaced apart from one another in a defined manner corresponding to the length of the planar surface 8 and via which the lens mount and lens tube are fixed in a force-fitting manner in relation to one another.

Second slots 7 may also advantageously be introduced in the segment 3, and this makes it possible to influence the force/distance ratio of the segment 3. These second slots 7 advantageously run perpendicularly to the first slot 2 and are advantageously open in the direction of the circumferential surface of the mounting ring 1. They do not pass right through the segment 3.

A method of producing a lens mount will be described hereinbelow. Four production states of the lens mount are shown to support this in FIGS. 2a to 2d. As already explained, a true-to-scale illustration has been dispensed with here in favor of showing the alterations, in particular the alteration in the external diameter.

First of all, the mounting ring 1 is produced, the external diameter thereof being turned to an oversize $d_{ü}$. It could also be turned to a larger external diameter, in particular if the lens 6 is inserted prior to the method step of turning the external diameter to a nominal dimension $d_N$, in which case the mechanical axis of the mounting ring 1 is made to coincide with the optical axis of the lens 6 by a lathe centering operation. It is also possible, however, for the lens 6 to be inserted at a later point in time during the production method or thereafter.

Then, for example electric discharge machining is used to introduce at least one first slot 2, which passes right through the mounting ring 1 and has a width b, tangentially to an imaginary circular line around the axis of symmetry 1.0 of the mounting ring 1. The part of the mounting ring 1 between the first slot 2 and the circumferential surface of the mounting ring 1 forms a cylinder-portion-like segment 3 in the mounting ring 1.

A stepped drill hole 4 is drilled in the center of said segment 3, along a line of symmetry 3.0 of the segment 3 and in a radial direction in relation to the axis of symmetry 1.0 of the mounting ring 1, wherein the drill hole 4 continues in the mounting ring 1, beyond the first slot 2, in the form of a threaded drill hole. The drill hole 4 is dimensioned such that it can accommodate a screw 5, including a screw head.

In a subsequent installation step, a screw 5 is introduced into the drill hole 4 and tightened fully, until the first slot 2 is closed beneath the head of the screw 5, as a result of which the segment 3 is deformed to the maximum extent.

Then, the mounting ring 1 is turned to an external diameter with a nominal dimension $d_N$, wherein, at least in part, the at least one segment 3 does not end up being machined or, at least in part, the segment is turned to an external diameter with the oversize $d_ü$ only when a larger external diameter has been turned in the first instance.

If the lens mount is to be used not just to fix a mounted lens 6 radially within a lens tube, but also to adjust it radially therein, then a plurality of, advantageously precisely three, first slots 2 are introduced at equal angular intervals α in relation to one another, as a result of which three cylindrical segments 3 are formed.

It is advantageously the case that, prior to the operation of turning the mounting ring 1 to an external diameter with a nominal dimension $d_N$, the lens 6 is inserted into the mounting ring 1, as a result of which the turning operation is executed in the form of a lathe centering operation.

Second slots 7, which do not pass right through the segment 3, are introduced perpendicularly to the one first slot 2, as a result of which the segment 3 undergoes weakening via which it is possible to influence the force/distance ratio of the restoring force by which the segment 3 attempts to return into its non-braced position within the mounting ring 1.

It is advantageously possible for a planar surface 8, which is located perpendicularly to the center line of the drill hole 4, to be formed on the circumferential surface bounding the segment 3.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A method of producing a lens mount, which can be fixed radially in a lens tube, the comprising:
   producing a mounting ring with an axis of symmetry and an external diameter with an oversize;
   introducing at least one closed-end first slot, which runs tangentially to an imaginary circular line around the axis of symmetry and has a width, as a result of which a cylinder-portion-like segment, which is bounded by the first slot and has a line of symmetry, is formed in the mounting ring;
   introducing a stepped drill hole into the at least one formed segment, arranged along the line of symmetry in a radial direction in relation to the axis of symmetry, wherein the drill hole continues in the mounting ring, beyond the first slot in the form of a threaded drill hole and can accommodate a screw including a screw head;
   introducing a screw into the drill hole and tightening said screw fully until the first slot is completely closed beneath the head of the screw and the segment is deformed; and
   turning the mounting ring to an external diameter with a nominal dimension (dN), wherein the at least one segment, at least in part, does not end up being machined.

2. The method as claimed in claim 1, wherein precisely three first slots are introduced at equal angular intervals from one another, as a result of which three cylindrical segments are formed.

3. The method as claimed in claim 1, wherein, prior to the operation of turning the mounting ring to the external diameter with the nominal dimension, a lens is inserted into the mounting ring as a result of which the turning operation is executed in the manner of a lathe centering operation.

4. The method as claimed in claim 1, wherein second slots, which do not pass right through the segment, are introduced perpendicularly to the at least one first slot.

5. The method as claimed in claim 1, wherein the at least one drill hole has formed around it a planar surface, which is located perpendicularly of the drill hole.

6. A lens mount, which can be fixed radially in a lens tube, comprising a mounting ring which has an axis of symmetry and in which at least one closed-end first slot, which is arranged tangentially to an imaginary circular line around the axis of symmetry (1.0) and has a width, forms a cylinder-portion-like segment, which is bounded by the first slot, wherein a stepped drill hole is present in the formed segment, arranged along a line of symmetry and in a radial direction in relation to the axis of symmetry, and said drill hole continues in the mounting ring, beyond the first slot, in the form of a threaded drill hole, wherein an entire screw, including a screw head, is accommodated in the drill hole within the mounting ring, and the external diameter of the circumferential surface of the mounting ring adjacent to the at least one segment has a nominal dimension, which is smaller than an oversize exhibited by the external diameter of the circumferential surface of the mounting ring, at least in part, along the at least one segment.

7. The lens mount as claimed in claim 6, wherein precisely three first slots, arranged at equal angular intervals from one another, are introduced into the mounting ring and thus three cylinder-portion-like segments are formed, as a result of which it is also possible to adjust the lens mount within a lens tube.

8. The lens mount as claimed in claim 6, wherein second slots, which do not pass right through the segment, are present in the at least one segment perpendicularly to the first slot.

9. The lens mount as claimed in claim 6, wherein the at least one drill hole has formed around it a planar surface, which runs perpendicularly to the drill hole.

\* \* \* \* \*